(12) United States Patent
Bidner et al.

(10) Patent No.: US 6,912,842 B2
(45) Date of Patent: Jul. 5, 2005

(54) OXYGEN STORAGE CAPACITY ESTIMATION

(75) Inventors: David Karl Bidner, Livonia, MI (US); Grant Alan Ingram, West Lafayette, IN (US); Gopichandra Surnilla, West Bloomfield, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 902 days.

(21) Appl. No.: 09/884,752

(22) Filed: Jun. 19, 2001

(65) Prior Publication Data

US 2002/0189237 A1 Dec. 19, 2002

(51) Int. Cl.⁷ .............................................. F01N 3/00
(52) U.S. Cl. .............................. 60/277; 60/274; 60/276; 60/285
(58) Field of Search .......................... 60/274, 276, 277, 60/285, 297, 286

(56) References Cited

U.S. PATENT DOCUMENTS

| | | | |
|---|---|---|---|
| 5,267,472 A | 12/1993 | Schneider et al. | |
| 5,351,484 A | * 10/1994 | Wade | 60/274 |
| 5,602,737 A | 2/1997 | Sindano et al. | |
| 5,713,199 A | 2/1998 | Takeshima et al. | |
| 5,743,084 A | 4/1998 | Hepburn | |
| 5,778,666 A | 7/1998 | Cullen et al. | |
| 5,819,530 A | * 10/1998 | Asano et al. | 60/277 |
| 5,832,722 A | 11/1998 | Cullen et al. | |
| 5,894,725 A | 4/1999 | Cullen et al. | |
| 6,125,629 A | 10/2000 | Patchett | |
| 6,220,018 B1 | * 4/2001 | Yamanashi et al. | 60/285 |
| 6,370,869 B1 | * 4/2002 | Hirota et al. | 60/276 |
| 6,374,596 B2 | * 4/2002 | Taga et al. | 60/277 |

* cited by examiner

Primary Examiner—Thomas Denion
Assistant Examiner—Binh Tran
(74) Attorney, Agent, or Firm—Julia Voutyras; Allan J. Lippa

(57) ABSTRACT

A more precise method for determining the oxygen storage capacity of an exhaust gas aftertreatment device is presented. The most accurate capacity estimate is obtained while the engine is idling or during low load operation. The capacity is determined by integrating the output of an oxygen sensor located downstream of the device during a period of time that it takes to store more than a predetermined amount of oxygen in the device. The overall LNT efficiency can then be inferred from its oxygen storage capacity. This method allows for improved emission control and fuel economy.

20 Claims, 2 Drawing Sheets

OXYGEN STORAGE CAPACITY ESTIMATION

FIELD OF INVENTION

The present invention relates to a system and a method for estimating an efficiency of an exhaust gas aftertreatment device, and more particularly, to estimating oxidant storage capacity of a Lean NOx Trap coupled downstream of an internal combustion engine.

BACKGROUND OF THE INVENTION

Internal combustion engines are typically coupled to an emission control device known as a three-way catalytic converter (TWC) designed to reduce combustion by-products such as carbon monoxide (CO), hydrocarbon (HC) and oxides of nitrogen (NOx). Engines can operate at air-fuel mixture ratios lean of stoichiometry, thus improving fuel economy. For lean engine operation, an additional three-way catalyst commonly referred to as a Lean NOx Trap, is usually coupled downstream of the three way catalytic converter. The LNT stores exhaust gas components such as oxidants, i.e., NOx and oxygen, when the engine is operating at a lean air-fuel ratio, and releases and reduces (purges) them when the engine is operating at a rich or stoic air-fuel ratio.

Over time, the ability of the LNT to store exhaust gas components can decrease due to such factors as sulfur deposits (SOx) from the fuel. Therefore, when the LNT storage capacity is sufficiently reduced, a SOx purge has to be performed. Since SOx purges result in fuel economy penalties, it is desirable not to purge unnecessarily. Thus, in order to maintain adherence to emission standards and obtain fuel economy benefits of a lean burning engine, the capacity of the LNT to store exhaust gas components needs to be monitored. The LNT efficiency can be inferred from the amount of oxygen that the LNT can store. One such method and system are described in U.S. Pat. No. 5,743,084. The system includes an LNT and an upstream and downstream oxygen sensors coupled to the LNT. The method correlates the change in the oxygen storage capacity to the change in the amount of time for the downstream oxygen sensor to switch to rich once a purge of the LNT is initiated. During rich operation, the fuel in the rich exhaust mixture entering the LNT will react with the oxygen stored in the LNT and therefore the tailpipe sensor will not switch to reading rich until all of the stored oxygen is depleted. The decrease in the lean to rich switch time of the downstream sensor indicates the overall decrease in the oxygen storage capacity of the LNT.

The inventors herein have recognized a disadvantage with this approach. Namely, when capacity estimates are performed under normal or high load driving conditions, i.e., at high space velocity, the reductant present in the exhaust gas entering the LNT does not have enough time to react with the stored oxygen. Therefore, not all of the oxygen is purged during high load operation resulting in an inaccurate efficiency estimate. Further, reductant wastage occurs due to the fact that it blows through the LNT at high speed.

SUMMARY OF THE INVENTION

In solving the above problem, a system and a method for monitoring efficiency of a Lean NOx Trap (LNT) by correlating it to the oxygen storage capacity are provided. In carrying out the above solution, features and advantages of the present invention, a system and a method for monitoring an efficiency of an exhaust gas aftertreatment device disposed in an exhaust passage of an internal combustion engine include providing an indication of low space velocity; in response to said indication, purging stored exhaust gas components from the device by operating the engine at an air-fuel ratio lean of stoichiometry; subsequently operating the engine at an air-fuel ratio lean of stoichiometry thereby causing said exhaust gas components to be stored in the device; and calculating an amount of said stored exhaust gas component stored in the device as a result of said lean operation.

The present invention provides a number of advantages. For example, the present invention allows for much more accurate estimate of oxygen storage capacity, since at idle or low load operation all of the oxygen is purged from the LNT and reductant wastage is eliminated. In addition, the oxygen storage capacity of the present invention is directly calculated rather than inferred, and is therefore more accurate than in prior art method. The improved precision in oxygen storage capacity determination will prevent unnecessary purges allowing for more lean running time, and increased fuel economy. Also, improved emission control can be achieved due to improved accuracy.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

As will be appreciated by those of ordinary skill in the art, the present invention is independent of the particular underlying engine technology and configuration. As such, the present invention may be used in a variety of types of internal combustion engines, such a s conventional engines in addition to direct injection stratified charge (DISC) or direct injection spark ignition engines (DISI).

Figure 1:
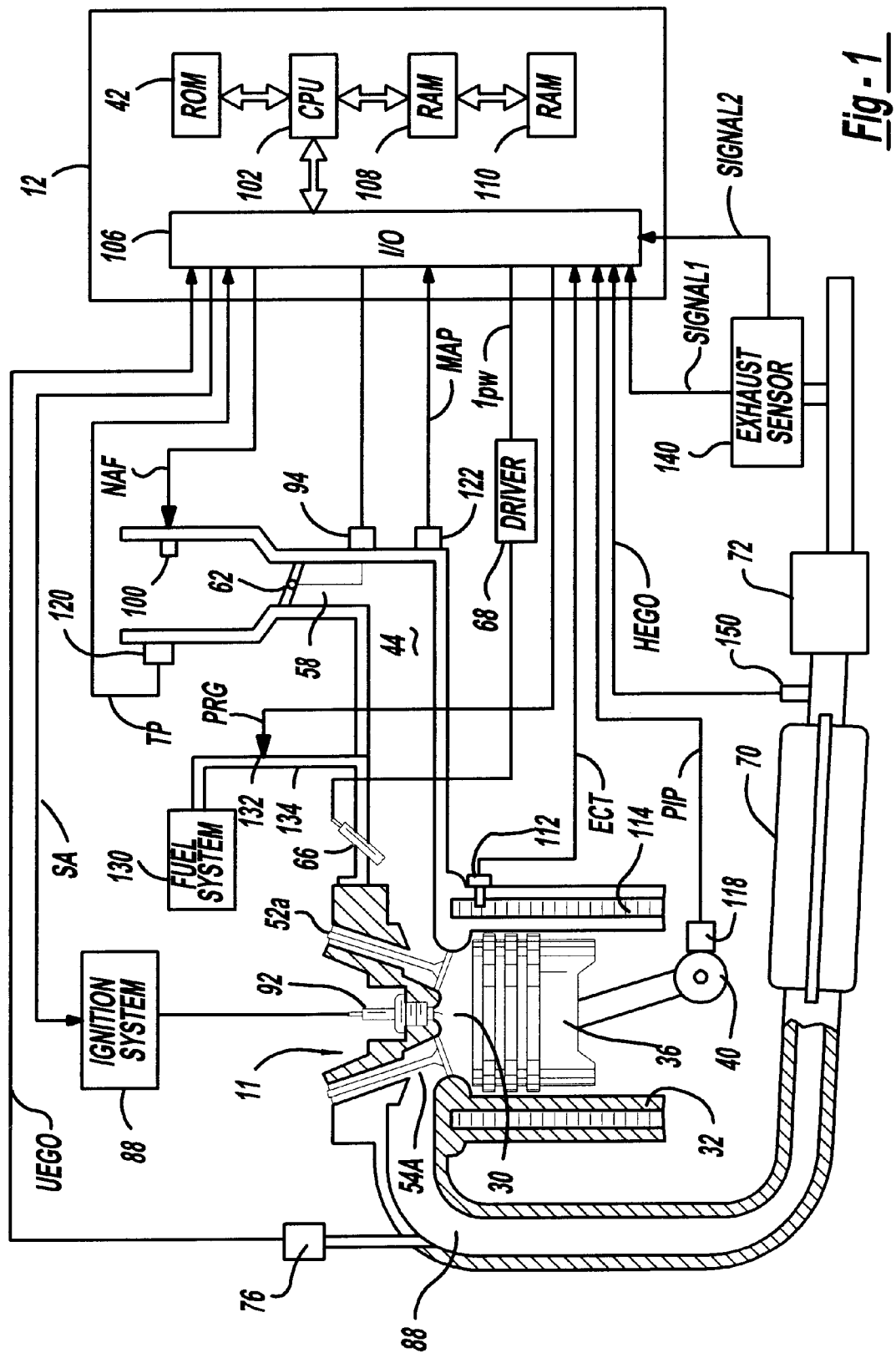
FIG. 1 is a block diagram of an internal combustion engine illustrating various components related to the present invention.

A block diagram illustrating an engine control system and method for a representative internal combustion engine according to the present invention is shown in FIG. 1. Preferably, such an engine includes a plurality of combustion chambers only one of which is shown, and is controlled by electronic engine controller 12. Combustion chamber 30 of engine 10 includes combustion chamber walls 32 with piston 36 positioned therein and connected to crankshaft 40. In this particular example, the piston 30 includes a recess or bowl (not shown) for forming stratified charges of air and fuel. In addition, the combustion chamber 30 is shown communicating with intake manifold 44 and exhaust manifold 48 via respective intake valves 52a and 52b (not shown), and exhaust valves 54a and 54b (not shown). A fuel injector 66 is shown directly coupled to combustion chamber 30 for delivering liquid fuel directly therein in proportion to the pulse width of signal fpw received from controller 12 via conventional electronic driver 68. Fuel is delivered to the fuel injector 66 by a conventional high-pressure fuel system (not shown) including a fuel tank, fuel pumps, and a fuel rail.

Intake manifold 44 is shown communicating with throttle body 58 via throttle plate 62. In this particular example, the throttle plate 62 is coupled to electric motor 94 such that the position of the throttle plate 62 is controlled by controller 12 via electric motor 94. This configuration is commonly referred to as electronic throttle control, (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. In this particular example, sensor 76 is a universal exhaust gas oxygen (UEGO) sensor, also known as a proportional oxygen sensor. The UEGO sensor generates a signal whose magnitude is proportional to the oxygen level (and the air-fuel ratio) in the exhaust gases. This signal is provided to controller 12, which converts it into a relative air-fuel ratio. Advantageously, signal UEGO is used during feedback air-fuel ratio control in to maintain average air-fuel ratio at a desired air-fuel ratio as described later herein. In an alternative embodiment, sensor 76 can provide signal EGO, exhaust gas oxygen (not shown), which indicates whether exhaust air-fuel ratio is lean or rich of stoichiometry.

In another alternate embodiment, the sensor 76 may comprise one of a carbon monoxide (CO) sensor, a hydrocarbon (HC) sensor, and a NOx sensor that generates a signal whose magnitude is related to the level of CO, HC, NOx, respectively, in the exhaust gases.

Those skilled in the art will recognize that any of the above exhaust gas sensors may be viewed as an air-fuel ratio sensor that generates a signal whose magnitude is indicative of the air-fuel ratio measured in exhaust gases.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel layers are thereby formed. The stratum closest to the spark plug contains a stoichiometric mixture or a mixture slightly rich of stoichiometry, and subsequent strata contain progressively leaner mixtures. In the homogeneous mode, controller 12 activates fuel injector 66 during the intake stroke so that a substantially homogeneous air-fuel mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Lean NOx Trap 72 is shown positioned downstream of catalytic converter 70. Both devices store exhaust gas components, such as $NO_x$ and oxidants, when engine 10 is operating lean of stoichiometry. The stored exhaust gas components are subsequently reacted with HC and other reductant and are catalyzed during a purge cycle when controller 12 causes engine 10 to operate in either a rich mode or a near stoichiometric mode.

Exhaust gas oxygen sensor 150 is shown coupled to exhaust manifold 48 between the catalytic converter 70 and the NOx trap 72. In this particular example, sensor 150 provides signal HEGO to controller 12, and essentially serves as a switch providing information as to whether the air-fuel mixture is lean or rich at the mid-bed location.

Controller 12 is shown in FIG. 1 as a conventional microcomputer including but not limited to: microprocessor unit 102, input/output ports 104, an electronic storage medium for executable programs and calibration values, shown as read-only memory chip 106 in this particular example random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine. load.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Exhaust sensor 140 is a NOx/UEGO sensor located downstream of the LNT. It produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

In a preferred embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where $NO_x$ is decomposed and measured by a second pumping current using the predetermined level. Nitrogen oxide concentration can then be indicated based on this second pumping current. In an alternative embodiment, a separate NOx sensor could be used in conjunction with an air-fuel sensor, which could be a UEGO or a HEGO sensor.

Figure 2:
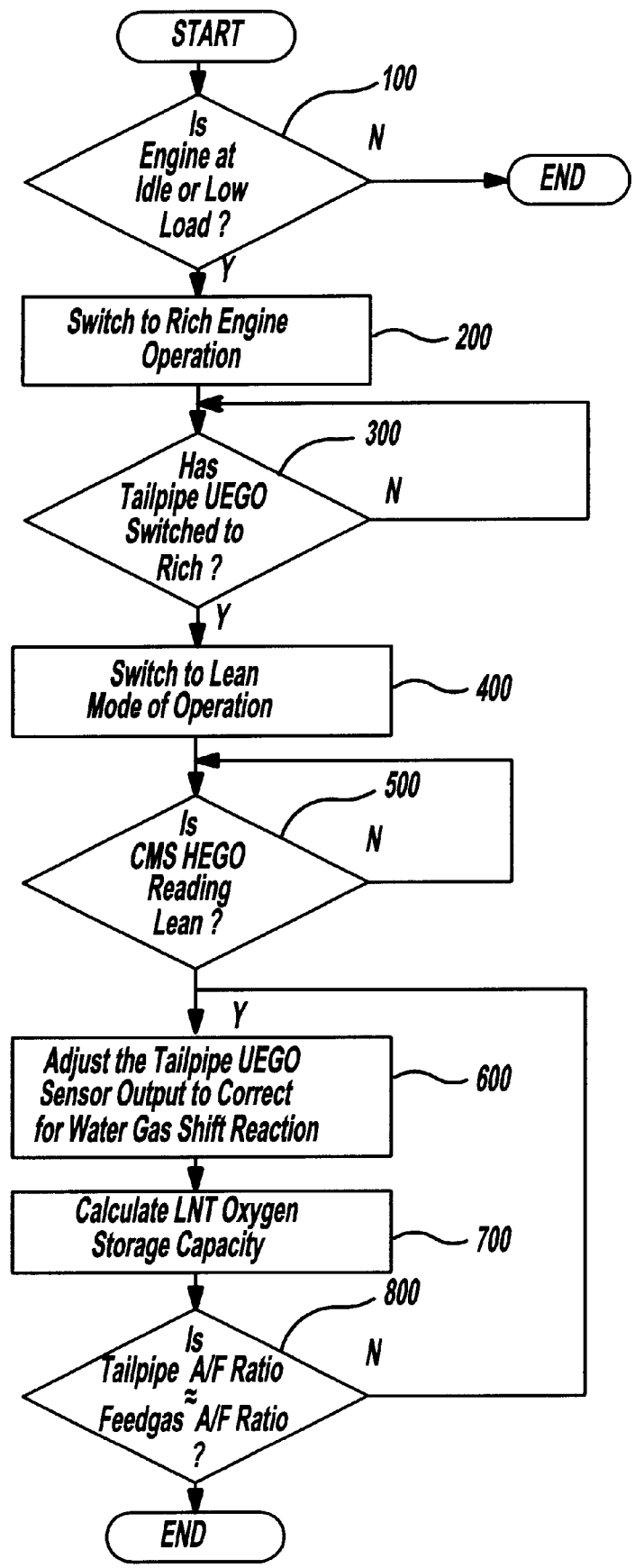
FIG. 2 is a block diagram of the embodiment in which the invention is used to advantage.

The diagram in FIG. 2 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, I parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Referring now to FIG. 2, first, in a decision block 100 a determination is made whether the engine is operating at idle or low load conditions. If the answer is NO, the routing cycles through step 100, until the engine is at idle or low load conditions. Once the answer to decision block 100 is YES, the routine proceeds to step 200 wherein the engine is operated rich in order to purge all of the stored exhaust gas components from the system, so that capacity estimation can begin with a known state of the LNT. The rich operation continued until, in step 300, the UEGO sensor 140 located downstream of the LNT starts reading rich, i.e., all of the oxygen is purged from the device. Once the answer to step 300 is YES, the routine proceeds to step 400 wherein storage capacity estimation begins by switching to lean mode of operation. Continuing on to step 500, a determination is made whether the catalyst monitoring HEGO sensor is reading lean indicating that the TWC is saturated with oxygen. If the answer to step 400 is no, the routine returns to step 400. If the answer to step 400 is YES, i.e., the TWC is saturated with oxygen, and the excess oxygen present in the lean exhaust gas will be stored in the LNT, the routine proceeds to step 600 wherein the output of the tailpipe UEGO sensor, LNT_UEGO, is adjusted to correct for the water gas shift reaction that occurs in the exhaust system according to the following equation:

$$LNT\_UEGO\_CORR = LNT\_UEGO + BIAS\_CORR$$

wherein LNT_UEGO_CORR is the corrected output of the tailpipe UEGO sensor, and BIAS_CORR is the bias correction due to the water gas shift reaction.

Next, in step 700, the integration of oxygen is performed using the corrected sensor output to obtain LEAN_OX_LNT, the amount of oxygen storage in the LNT, according to the following equations:

$$LEAN\_OX\_LNT = LEAN\_OX\_LNT + DELTA\_O2$$

$$DELTA\_O2 = (TWC\_UEGO - MAX(1.0, LNT\_UEGO\_CORR)) * (AM/60) * (1/S) * OX\_wt * delta\_time$$

wherein delta_time is the amount of time between updates, OX_wt is the mass concentration of oxygen in the air, S is the stoichiometric air fuel ratio of the fuel used, and TWC_UEGO is the air fuel ratio indicated by the UEGO sensor located upstream of the TWC.

The routine then proceeds to step 800 wherein a determination is made whether the output of the tailpipe air fuel ratio (as indicated by the corrected tailpipe UEGO sensor signal) is within a predetermined constant of the feedgas air fuel ratio (as indicated by the UEGO sensor upstream of the TWC). If the answer to step 800 is NO, the routine returns to step 600. If the answer to step 800 is YES, indicating that the LNT is saturated with oxygen, integration ends, and the routine exits.

Therefore, according to the present invention, it is possible to monitor the oxygen storage capacity of the LNT by monitoring the corrected output of an exhaust gas sensor located downstream of the LNT. By estimating storage capacity at low engine loads, improved accuracy can be achieved. The measure of oxygen storage amount can then be used to estimate the LNT efficiency, and to schedule sulfur-purging events when necessary.

This concludes the description of the invention. The reading of it by those skilled in the art would bring to mind many alterations and modifications without departing from the spirit and the scope of the invention. Accordingly, it is intended that the scope of the invention be defined by the following claims.

What is claimed is:

1. A method for monitoring an efficiency of an exhaust gas aftertreatment device disposed in an exhaust passage of an internal combustion engine, the method comprising:
   providing an indication of low space velocity;
   in response to said indication, purging stored exhaust gas components from the device by operating the engine at an air-fuel ratio rich of stoichiometry;
   subsequently operating the engine at an air-fuel ratio lean of stoichiometry thereby causing said exhaust gas components to be stored in the device; and
   calculating an amount of said stored exhaust gas component stored in the device as a result of said lean operation.

2. The method as set forth in claim 1, wherein the exhaust gas aftertreatment device is a three-way catalyst.

3. The method cited in claim 1, further comprising a sensor coupled downstream of the exhaust gas aftertreatment device.

4. The method cited in claim 3, wherein the sensor is an exhaust gas sensor.

5. The method cited in claim 4, wherein the exhaust gas sensor is an oxygen sensor.

6. The method cited in claim 1, wherein said exhaust gas component is oxygen.

7. The method cited in claim 1, further comprising performing a sulfur purge if said stored exhaust gas component amount is below a preselected value.

8. The method cited in claim 3, wherein said lean operation continues until an exhaust gas sensor output reaches a predetermined value.

9. A method for monitoring a capacity of an exhaust gas aftertreatment device disposed in an exhaust passage of an internal combustion engine, the device having a sensor coupled downstream of it, the method comprising:
   providing a first indication of low space velocity;
   providing a second indication of a device condition;
   in response to said first and said second indication operating the engine at an air-fuel ratio lean of stoichiometric until the sensor output reaches a predetermined value; and
   calculating an amount of an exhaust gas component stored in the device as a result of said lean operation.

10. The method as set forth in claim 9, wherein said second indication is provided when said amount of said stored exhaust gas component stored in the device is below a preselected value.

11. The method cited in claim 9, wherein said exhaust gas component is oxygen.

12. The method cited in claim 9, wherein the sensor is an exhaust gas sensor.

13. The method cited in claim 9, wherein said exhaust gas sensor is an oxygen sensor.

14. The method as set forth in claim 9, wherein said second indication occurs when said exhaust sensor output is at a preselected value lean of stoichiometry.

15. The method cited in claim 9, wherein the exhaust component storage device is a three-way catalyst.

16. The method as set forth in claim 9, further comprising performing a sulfur purge when said calculated amount of said stored exhaust component is below a predetermined value.

17. A system for monitoring storage capacity of an exhaust gas aftertreatment device disposed in an exhaust passage of an internal combustion engine, the system comprising:

a sensor coupled downstream of the device; and a controller for providing an indication of low space velocity, in response to said indication purging the device of a stored exhaust gas component by operating the engine at an air-fuel ratio rich of stoichiometry, said controller subsequently operating the engine at an air-fuel ratio lean of stoichiometry until said output of said sensor is reading a value lean of stoichiometry, and for calculating an amount of an exhaust gas component stored in the device as a result of said lean operation.

18. The system as set forth in claim 17, wherein said sensor is an oxygen sensor.

19. The system as set forth in claim 17, wherein said exhaust gas component is oxygen.

20. The system cited in claim 19, wherein said controller further performs a sulfur purge of the device is said calculated amount of stored oxygen is below a predetermined value.

* * * * *